May 9, 1967 K. D. BARTLEY 3,319,060

ILLUMINATING SIGN

Filed Sept. 9, 1964 2 Sheets-Sheet 1

INVENTOR
K. D. BARTLEY
BY [signature]
ATTORNEY

May 9, 1967 K. D. BARTLEY 3,319,060

ILLUMINATING SIGN

Filed Sept. 9, 1964 2 Sheets-Sheet 2

United States Patent Office 3,319,060
Patented May 9, 1967

3,319,060
ILLUMINATING SIGN
Keith D. Bartley, Indianapolis, Ind., assignor to Bell Telephone Laboratories, Incorporated, New York, N.Y. a corporation of New York
Filed Sept. 9, 1964, Ser. No. 395,153
7 Claims. (Cl. 240—73)

This invention relates to illuminating signs, particularly for designating and illuminating coin telephone shelves, directory stations, or other telephone equipment.

Such signs are located above telephone equipment. They invite utilization with legends such as "Telephone" or "Directories" and simultaneously illuminate the equipment below to permit telephone dialing and use of the directory. Where several telephones and directory stations stand in a group, a like number of illuminating signs are aligned above them.

Ordinary practice dictates energizing single illuminating signs through a flexible cord terminating in a plug. The various safety organizations that establish safety requirements, for example, Underwriters' Laboratories, insist that such plug-in signs must be mountable and removable without the use of tools.

Ordinary practice also dictates energizing groups of illuminating signs sequentially from a single line. However, the same safety organizations demand that such a line consist of armored cable, and that where armored cable is used the units be permanently mounted so as to be removable only with the use of tools. These contradictory mounting requirements for single and multiple installations would make a removable sign unsuitable for group installation, and vice versa. Yet, producing separate models of illuminating signs to accommodate the requirements for single and multiple installations requires expenditure of considerable time and material.

Thus, it is an object of the present invention to render a single model of an illuminating sign usable either singly or in a group, conforming to all requirements of the safety organizations, and yet requiring no modification for different uses, or only slight modification of an uncritical nature that can be accomplished in the field.

Another object of the invention is to simplify the anchoring of such a sign either in a removable or permanent installation and yet maintain sufficient strength to withstand considerable abuse during operation.

According to a principle of the invention, such a sign comprises a housing enclosing a light adapted to be connected to an electrical source and is cantilevered from a wall by furnishing the rear of the housing with a heavy bracket member that engages a wall-mounted backboard member, by furnishing one member with an inverted upper channel and an upright lower channel, by embracing with the channels, ascending and depending flanges on the other member, by making the channels sufficiently deep so as to permit the housing to be moved vertically and to be desengaged by vertical movement, and by forming on the inner surface of one channel and in the disengagement path of one of the flanges a vertical space for receiving stop means that can pass through the channel in the disengagement path of the flange and prevent disengagement of the housing without passing through the flanges.

According to another aspect of the invention, the member with channels is the bracket member on the housing, and in the mounted position the upper flange and channel and the lower flange and channel form respective vertical paths over which they remain in engagement as the housing is moved vertically and wherein the lower engagement path is greater than the upper engagement path. The significance of the lower engagement path being greater, and the significance of one flange and channel forming a vertical space will become evident from the manner in which the housing is mounted and unmounted from the backplate.

Mounting the housing upon the backboard is accomplished by first engaging the lower channel of the bracket member with the lower flange on the backboard and lifting the housing through most of the engagement path until the upper channel can fit over and engage the upper flange. The housing is then lowered. The upper flange and channel remain securely in engagement whereas the lower channel moves in a direction that will disengage it from the lower flange. However, because the upper engagement path is shorter than the lower engagement path, the housing will reach its lower limit before the lower flange member disengages from the lower channel member. Yet, the lower engagement path of greater length has, during lowering of the housing, left a space between the bottom of the lower channel and the bottom of the lower flange. Lifting the sign and tilting it down disengages the housing without the use of tools. The use of tools for disengagement can be made essential by passing a bolt through the lower channel below the lower flange without passing through the flange. Holes for such a bolt can be provided beforehand during production or, because the bolt does not pass through the lower flange, can be made with the slight accuracy required by field personnel. Thus, small uncritical alterations convert the basic sign structure from a removable to a permanent fixture.

These and other features of the invention are pointed out in the claims. Other objects and advantages of the invention will become apparent from the following detailed description of a sign employing features of the invention when read in light of the accompanying drawing, wherein:

Figures 1, 5, 6, 7:
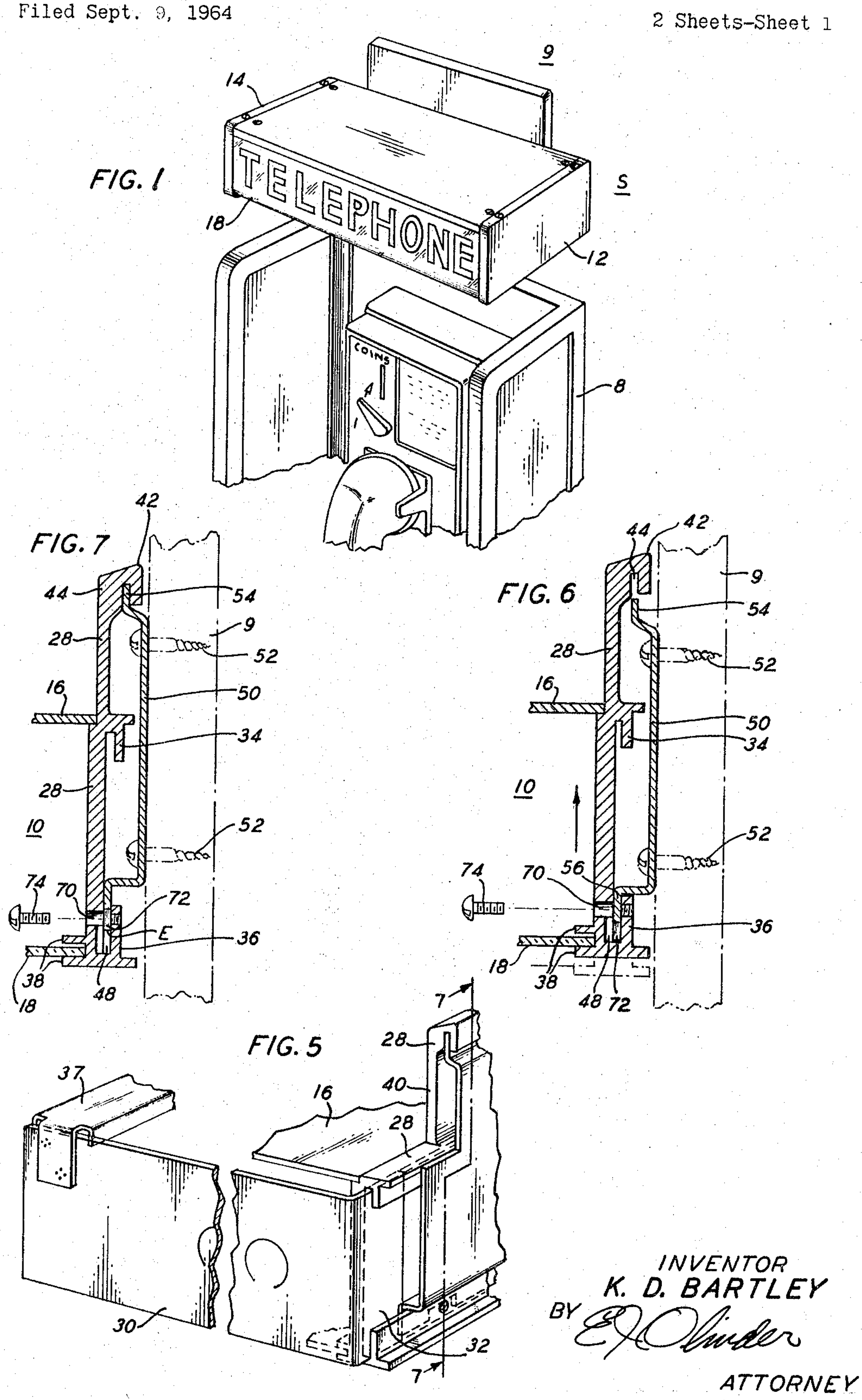
FIG. 1 illustrates perspectively a sign according to the invention cantilevered over a coin telephone shelf.
FIG. 5 is a broken-away perspective detail of the interior support of the sign in FIGS. 3 and 4.
FIGS. 6 and 7 illustrate by enlarged partial sectional views of the bracket and backplate the manner in which the housing is mounted and unmounted.
Figure 2:
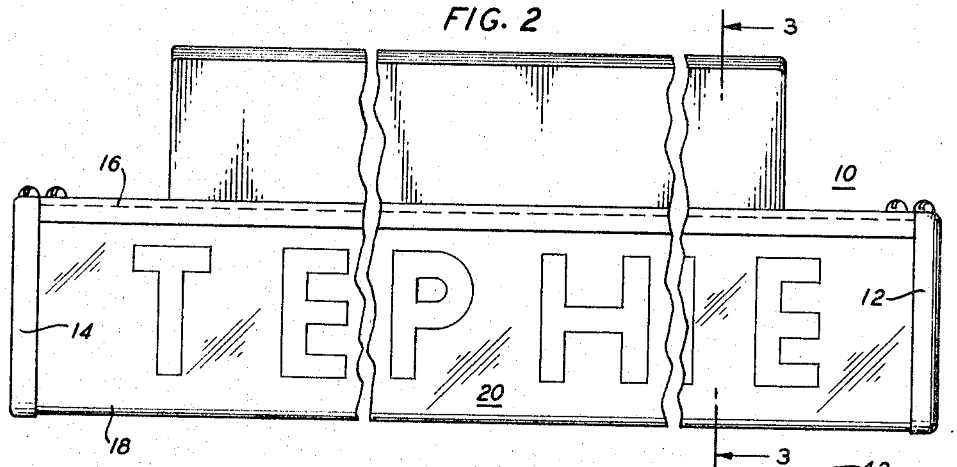
FIG. 2 is an elevation of a sign embodying features of the invention.

In FIG. 1, illustrating the manner in which a sign according to the invention is utilized, a coin telephone shelf 8 is illuminated by an overhanging elongated sign S carrying the legend "Telephone" and cantilevered from the same wall 9 as the telephone shelf. As seen from FIGS. 1 to 4, the sign S possesses a suitably attractive outer housing 10 that comprises two satin-finished aluminum end pieces 12 and 14 and a top frame 16, all supporting a twenty-four inch long L-shaped translucent acrylic panel 18. A vertical face 20 on the panel carries an appropriate legend, such as "Telephone" or "Directories," and a horizontal section 22 furnishes station illumination. Within the housing 10, a twenty-four inch twenty watt fluorescent lamp 24 powered by a trigger start ballast 26 furnishes end-to-end lighting of the panel. The installed sign extends approximately ten inches from the wall 9 and is three to four inches in vertical height. Ordinarily, the sign is cantilevered at a height of six feet, a few inches, above the telephone shelf 8.

Since such a low sign is subject to abuse, it is provided with an inner structure that is capable of withstanding considerable loads. This may best be seen by referring to FIGS. 3, 4, and 5. The foundation of this pport structure lies in a strong aluminum extruded ck bracket 28 of complex shape which forms a numr of channels, to be more fully discussed. For directly pporting the top frame 16 and end pieces 12 and 14, o steel side support brackets 30 extend to the front of e sign from the back. Only one of these support bracks 30 is shown at one end in FIG. 5, although another ists at the other end. The brackets 30 terminate at e back in flanges of about one inch which rigidly inter-ck with the ends of an inverted horizontal channel 34 truded along the middle of the back bracket 28 and upright horizontal channel 36 extruded at the bottom the back bracket. Rivets or welds at the end tabs of steel girder 37 secure the girder to the brackets 30 to rm a brace. Suitable screws secure the end pieces 12 d 14 and the top frame 16 to the brackets 30. A rizontal protrusion 38 extruded at the front face along e bottom of the back bracket 28 forms a slot for reiving the horizontal portion 22 of the acrylic translunt panel 18. Suitable channels on the end pieces 12 d 14 and top frame 16 also help retain the acrylic nel.

Figure 3:
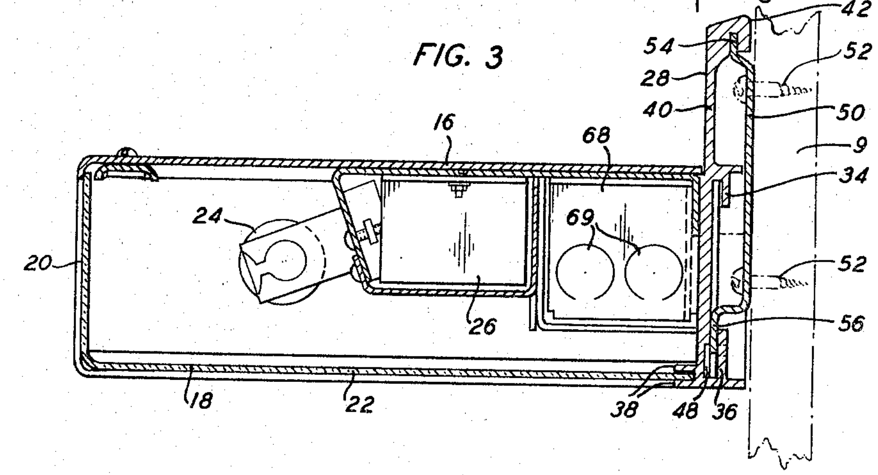
FIG. 3 is a section 3—3 of FIG. 2.
Figure 4:
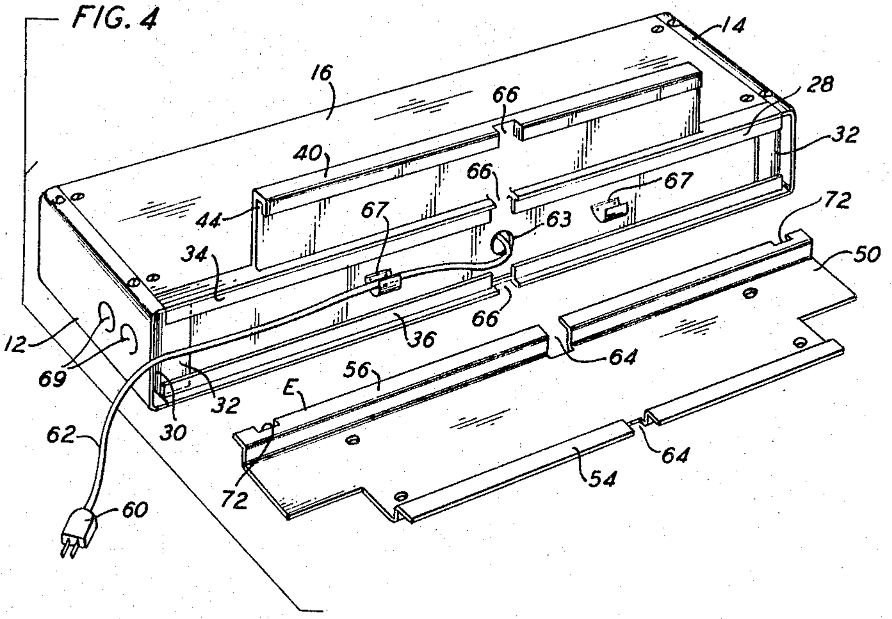
FIG. 4 is a perspective view of a disassembled sign according to the invention.

As best seen in FIG. 3, the aluminum extruded back acket 28 possesses an upwardly extending plate 40, aching approximately two inches above the top frame 5 and terminating at its upper edge in a horizontal inrted channel 42 forming a slot 44. The rising plate 0 improves the effective cantilevering power of the back acket 28. The horizontal channel 36 forms a slot 48 hose lower portion is thicker than its upper portion.

When the sign is mounted, the back bracket 28 enges a backboard 50 which is anchored to the wall 9 y screws 52. Bends at the top and lower edges of the ackboard 50 form an ascending flange 54 engageable the slot 44 of channel 42, and a depending flange 56 ngageable in the large horizontal center portion of the ot 48 of channel 42 which is not occupied by the flanges 2. The width of the backboard 50 is sufficiently small o avoid overlapping with the flanges 32 on the brackets 0. The relative distances between the channels 42 and 6 and the flanges 54 and 56 are such as to permit enagement of both flanges with both channels only if the ower channel first embraces the lower flanges. The ousing is lifted until the upper channel 42 embraces the pper flange 54.

The enlarged distance that the plate 40 produces beween the channels 42 and 36 aids the wall fasteners or crews 52 by permitting extension of the vertical spacng between them. These fasteners must resist a comined force of about six hundred pounds for a two hunrep pound load in the front edge of the sign.

The sign S possesses a three-prong plug 60 at the end f a power cord 62 for connection to a local power reeptacle, which connection may be made above or below e sign or through either end. An opening 63 at the enter of the bracket 28 provides a passageway for the ord 62 into the housing 10. Notches 64 in the backlate and notches 66 at the center of the back bracket 8 permit upward and downward access to the cord 62. ufficient space exists between the backplate and the back racket to allow horizontal egress of the cord 62. A air of semicircular horizontal supports 67, mounted beween the channels 34 and 36 on the back bracket 28, revent fouling of the cord 62 between the bracket 28 nd the backboard 50. A compartment 68 at the back f the sign assembly between the bracket 28 and the balast 26 completely stores the cord 62 when necessary.

When the sign is used singly, the cord 62 and plugs 60 re drawn from their compartment 68 through the openngs 63 and passed outwardly to be plugged in. Installing he sign requires first mounting the backboard 50 with the crews 52 on the wall 9. The bottom slot 48 and the ottom flange 56 are then engaged and the sign lifted so hat the flange 56 slips all the way into the slot 48. Installation continues by tipping the sign upwardly to engage the top slot 44 with the top flange 54. The housing 10 is now allowed to slide downwardly parallel to the wall 9. This movement engages the top flange 54 and slot 44 without loss of engagement of slot 48 with the flange 56. This mounting action is illustrated in detail in FIGS. 6 and 7. FIG. 6 illustrates the condition wherein the housing 10 has been lifted to the position wherein the slot 44 can engage the flange 54 just before the housing is lowered. FIG. 7 illustrates the relative position of the bracket 28 and backboard 50 after the housing has been lowered. The two full length steel flanges 54 and 56 and channels 36 and 42 prevent dislodging of the sign by accidental movement of one end. Both ends must be raised simultaneously to remove the sign housing 10 from the backboard.

Removal of the sign is possible without the use of tools simply by lifting the housing 10 from the position shown in FIG. 7 to disengage the top channel 42 on bracket 28 from the top flange 54 on backboard 50 as shown in FIG. 6. Tilting the front of the housing down and disengaging the bottom flange 56 from the bottom slot 48 removes the sign. The advantage of the wider portion at the bottom of slot 48 is evident from the fact that the housing must be tilted before removal.

Where several signs are to be mounted as a group, it is desirable to connect them all to a single outlet. As stated, safety organizations require such installation to be energized with an armored cable and require the signs to be permanently anchored to the wall so that they cannot be removed without the use of tools.

Access to the armored cables is provided by means of knockouts 69 in the aluminum end pieces 12 and 14 and in brackets 30. The cord 62, under these circumstances, is removed or stored within the compartment 68.

The housing anchorage is made permanent by tapping two holes 70 through both uprights of the lower channel 36. The holes are located below the bottom edge E (see FIG. 4) of the flange 54 as determined when the bracket 28 is mounted as shown in FIG. 7. However, as is obvious from FIG. 7, holes extending through the channel uprights below the major portion of the edge E would interfere with the horizontal protrusions 38 which support the acrylic panel 18. In the embodiment shown therefor, the edge E is shaped at each end in the vicinity of the holes 70 with two cutouts 72 which clear the holes by a comparatively wide margin when the housing is mounted as shown in FIG. 7. The cutouts 72 can be made quite wide since the edge E does not support the weight of the housing 10. According to the invention, two bolts 74 are passed through the holes 70 after the housing 10 has been mounted as shown in FIG. 7 and FIG. 3.

When it is desired to remove the housing, the bolts 74 will impede the lifting movement of the housing 10 and will make it impossible to remove the housing from the backboard 50. When the sign is mounted, the panel 18 is first removed and the bolts 74 passed through the holes below the backboard flange edge E at the cutout 72. In this manner two simple bolts, which do not engage the backplate at all, permanently secure the sign to the wall 9, thus conforming to requirements for permanently anchored sign assemblies. If permitted, the holes 70 can be provided during manufacture. However, production of special units for permanent installations is not necessary. Since the cutouts 72 in the backplate can be made quite large and since the bolts do not engage the backboard, the location of the holes 70 for the bolts is not critical. The structure thus provides a particularly simple and economical means for conforming to safety requirements of safety organizations such as Underwriters' Laboratories for both single and multiple signs, requiring changes that can be made, if necessary, in the field by equipment installation personnel.

While an embodiment of the invention has been shown in detail, it will be obvious to those skilled in the art that the invention may be embodied otherwise within its scope.

What is claimed is:

1. An illuminating structure, comprising a housing having illuminating means adapted to be connected to an electrical utility line, a bracket on said housing having an inverted upper channel and an upright lower channel, and a backplate having upper and lower flanges extending up and down in engagement with the respective upper and lower channels, said upper channel and flange and said lower channel and flange forming upper and lower paths over which engagement continues as said housing is moved up and down, said lower path being longer than said upper path so as to permit disengagement of said lower channel with the lower flange only after disengagement of the upper channel with the upper flange, whereby upon engagement of said upper flange and channel the lower channel partially disengages the lower flange, said lower flange and the inner surface of said lower channel forming a vertical space for receiving stop means that can pass through the lower channel below the flange, said housing having a plurality of rigid wall means enclosing said illuminating means, one of said wall means being translucent, said backplate being adapted for mounting on an upstanding face, said bracket extending along another of said wall means and when engaged with said backplate holding all of said wall means so that said housing projects outwardly from the face, whereby said illuminating means can light an area through said translucent wall means.

2. An illuminating structure, comprising a housing having illuminating means adapted to be connected to an electrical utility line, a bracket on said housing having an inverted upper channel and an upright lower channel, a backplate having upper and lower flanges extending up and down in engagement with the respective upper and lower channels, said upper channel and flange and said lower channel and flange forming upper and lower paths over which engagement continues as said housing is moved vertically, said lower path being longer than said upper path so as to permit engagement of said lower channel with the lower flange only before engagement of the upper channel with the upper flange, whereby upon engagement of said upper flange and channel the lower channel partially disengages the lower flange, and stop means passing through the lower channel below the lower flange for preventing removal of said bracket from said backplate, said housing having a plurality of rigid wall means enclosing said illuminating means, one of said wall means being translucent, said backplate being adapted for mounting on an upstanding face, said bracket extending along another of said wall means and when engaged with said backplate holding all of said wall means so that said housing projects outwardly from the face, whereby said illuminating means can light an area through said translucent wall means.

3. An illuminating structure, comprising a housing having illuminating means adapted to be connected to an electrical utility line, a bracket on said housing having an inverted upper channel and an upright lower channel, a backplate having upper and lower flanges extending up and down in engagement with the respective upper and lower channels, said upper channel and flange and said lower channel and flange forming upper and lower paths over which engagement continues as said housing is moved vertically, said lower path being longer than said upper path so as to permit engagement of said lower channel with the lower flange only before engagement of the upper channel with the upper flange, whereby upon engagement of said upper flange and channel the lower channel partially disengages the lower flange, the distance between the extreme interior surfaces of the respective channels being greater than the distance between the ends of the respective flanges by more than the vertical length of the shorter one of the two engaging members composed of the upper flange and upper channel but less than the vertical length of the shorter one of the two engaging members composed of the lower flange and the lower channel, said lower flange and the inner surface of said lower channel forming a vertical space, said channel forming an opening transverse to its longitudinal direction and in line with said space for receiving stop means that can pass through the lower channel below the flange.

4. An illuminating structure, comprising a housing having illuminating means adapted to be connected to an electrical utility line, a bracket on said housing having an inverted upper channel and an upright lower channel, a backplate having upper and lower flanges extending up and down in engagement with the respective upper and lower channels, said upper channel and flange and said lower channel and flange forming upper and lower paths over which engagement continues as said housing is moved vertically, said lower path being longer than said upper path so as to permit disengagement of said lower channel with the lower flange only after disengagement of the upper channel with the upper flange, whereby upon engagement of said upper flange and channel the lower channel partially disengages the lower flange, the distance between the interior surfaces of the channels being greater than the distance between the ends of the respective flanges by more than the vertical length of the shorter one of the two engaging members composed of the upper flange and upper channel but less than the vertical length of the shorter one of the two engaging members composed of the lower flange and lower channel, said lower flange and the inner surface of said lower channel forming a vertical space for receiving stop means that can pass through the lower channel below the flange, and stop means passing through the lower channel below the lower flange for preventing removal of said bracket from said backplate.

5. An illuminating structure, comprising a housing having illuminating means adapted to be connected to an electrical utility line, a bracket on said housing having an inverted upper channel and an upright lower channel, a backplate having upper and lower flanges extending up and down in engagement with the respective upper and lower channels, the relative size of said flanges and channels and the relative distances between flanges and between channels being such as to permit engagement of said lower channel with the lower flange only before engagement of the upper channel with the upper flange, whereby upon engagement of said upper flange and channel the lower channel partially disengages the lower flange, the distance between the opposing interior surfaces of the channels being greater than the distance between the ends of the respective flanges by more than the vertical length of the upper channel engaging the upper flange but less than the vertical length through which the lower channel engages the lower flange, said lower flange having a recess for forming with the inner surface of said lower channel a vertical space, an opening in said channel aligned with said recess for receiving stop means that can pass through the lower channel below the flange, said housing having a plurality of rigid wall means enclosing said illuminating means, one of said wall means being translucent, said backplate being adapted for mounting on an upstanding face, said bracket extending along another of said wall means and when engaged with said backplate holding all of said wall means so that said housing projects outwardly from the face, whereby said illuminating means can light an area through said translucent wall means.

6. An illuminating structure, comprising a housing having illuminating means adapted to be connected to an electrical utility line, a bracket on said housing having an inverted upper channel and an upright lower channel, a backplate having upper and lower flanges extending up and down in engagement with the respective upper and lower channels, the relative size of said flanges and chanls and the relative distances between flanges and be-'een channels being such as to permit engagement of id lower channel with the lower flange only before en-.gement of the upper channel with the upper flange, hereby upon engagement of said upper flange and chan-:l the lower channel partially disengages the lower flange, e distance between the interior surfaces of the chan-:ls being greater than the distance between the ends of e respective flanges by more than the vertical length ' the upper channel engaging the upper flange and less .an the vertical length through which the lower channel ıgages the lower flange, said lower flange and the inner ırface of said lower channel forming a vertical space for :ceiving stop means that can pass through the lower ıannel below the flange, and removable stop means pass-ıg through the lower channel below the lower flange ɔr preventing removal of said bracket from said back-late, said housing having a plurality of rigid wall means ıclosing said illuminating means, one of said wall means eing translucent, said backplate being adapted for mount-ıg on an upstanding face, said bracket extending along nother of said wall means and when engaged with said ackplate holding all of said wall means so that said hous-ıg projects outwardly from the face, whereby said il-ıminating means can light an area through said trans-ıcent wall means.

7. An illuminating structure, comprising a housing hav-ıg illuminating means adapted to be connected to an lectrical utility line, a bracket on said housing having pper and lower channels, said bracket comprising an luminum extrusion extending upwardly over the top of aid housing, a backplate having upper and lower flanges xtending up and down respectively to engage both chan-ıels, the relative size of said flanges and channels and the elative distances between flanges and between channels ıeing such as to permit engagement of said lower chan-ıel with the lower flange only before engagement of the upper channel with the upper flange, where upon engagement of said upper flange and channel the lower channel partially disengages the lower flange, said lower flange and the inner surface of said lower channel forming a vertical space, said lower flange forming a notch above said space, said channel forming an opening transverse to its longitudinal direction and in line with the notch for receiving stop means that can pass through the lower channel and said notch, said housing having a plurality of rigid wall means enclosing said illuminating means, one of said wall means being translucent, said backplate being adapted for mounting on an upstanding face, said bracket extending along another of said wall means and when engaged with said backplate holding all of said wall means so that said housing projects outwardly from the face, whereby said illuminating means can light an area through said translucent wall means.

References Cited by the Examiner

UNITED STATES PATENTS

| | | | |
|---|---|---|---|
| 1,416,969 | 5/1922 | O'Connor | 248—223 |
| 2,312,985 | 3/1943 | Bales | 248—223 |
| 2,317,192 | 4/1943 | Hopp | 248—223 |
| 2,708,711 | 5/1955 | McGinty | 240—51.11 X |
| 2,790,894 | 4/1957 | Zingone | 240—73 |
| 3,211,905 | 10/1965 | Picha et al. | 240—147 X |

References Cited by the Applicant

| | | |
|---|---|---|
| 2,655,330 | 1/1954 | Wong. |
| 2,928,199 | 3/1960 | Novak. |
| 2,998,508 | 8/1961 | Bobrick. |

NORTON ANSHER, *Primary Examiner.*

C. R. RHODES, C. B. PRICE, J. F. PETERS, *Assistant Examiners.*